UNITED STATES PATENT OFFICE.

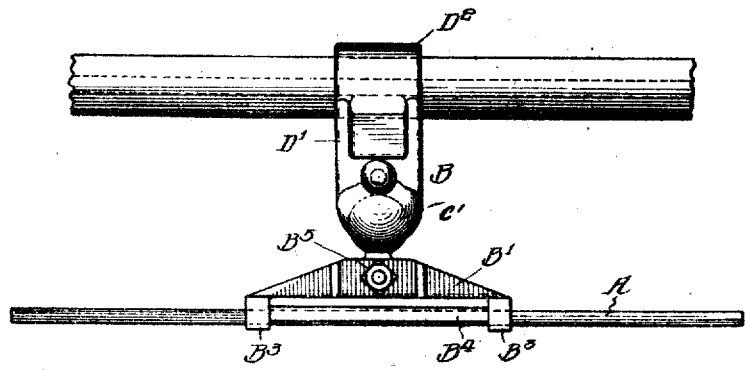
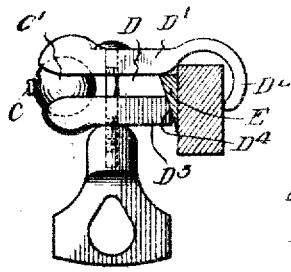
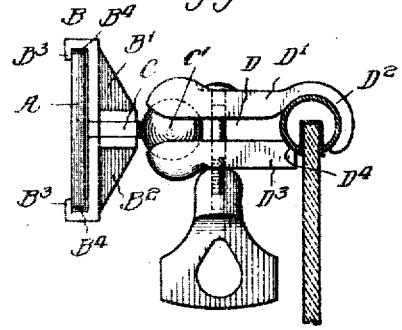
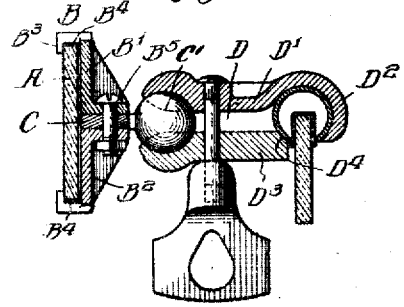
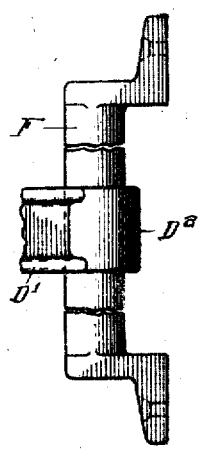

GEORGE H. LUTZ, OF BUFFALO, NEW YORK.

AUTOMOBILE-MIRROR.

1,324,456.    Specification of Letters Patent.    Patented Dec. 9, 1919.

Application filed September 24, 1919. Serial No. 326,109.

*To all whom it may concern:*

Be it known that I, GEORGE H. LUTZ, a citizen of the United States, residing at Buffalo, in the county of Erie and State of New York, have invented certain new and useful Improvements in Automobile-Mirrors, of which the following is a specification.

The present invention relates to a mirror, through means of which the driver of a vehicle may obtain a view of the roadway toward the rear, and has for its objects to provide a mirror which, while accomplishing such result, can be mounted in front of the driver within the car; to provide such a mirror that will give a more comprehensive disclosure of road conditions to the rear by developing lines of vision rearwardly not only alongside the car but through the back window thereof, and which can be instantly adjusted to either side of the car, and to afford such freedom of observation with minimum movement of the driver's head; to provide a mirror in the form of an elongated panel of glass with a holder for such mirror that will permit convenient introduction of the glass or renewal of the same as often as may be necessary and which will afford the necessary elasticity for taking up the unevenness and inaccuracy of dimensions of said glass and thus prevent breakage of the glass when clamping it in the holder; to provide a construction of mirror support that will be adapted for ready mounting upon the rail of the wind-shield, and with a wide range of horizontal adjustment as well as adjustment of vertical and horizontal angle thereon; and to provide a simple, durable and efficient construction through which to realize these several aims.

Accordingly, one feature of the invention consists in providing a holder constructed with a three-part adjustable gripper, comprising two jaws adapted to receive a horizontally elongated strip or panel-like mirror between them, and an interposed spacing plate upon which said jaws are held, preferably by a single screw; also a clamp adapted to engage a portion of the vehicle structure upon which the mirror is to be mounted with freedom of horizontal adjustment thereon; and a ball and socket joint between the clamp and the mirror gripper that affords flexibility upon at least horizontal and vertical axes, the clamping members as well as the socket for the ball being provided by two clamping plates held together by a single clamping screw that serves alike for clamping the holder to the vehicle structure and clamping the concave faces of the socket members upon the ball; so that instant adjustability of the mirror along the vehicle structure, for example, the rail or frame of the wind-shield, as well as angular adjustment of the glass may be accomplished by manipulation of the single screw; the clamp being preferably located inwardly from the end of the mirror sufficiently to permit the latter to project outward and thereby develop a line of vision more directly rearward along the side of the vehicle, while still reflecting the view over the back or through the rear window, and the instant detachability or shiftability of the device from one point to another being such that the entire panorama in the center or at either side in the rear of the car will be clearly visible to the driver.

Subordinate features incident to the foregoing consist in constructing the gripper with a pair of substantially identical jaws with opposed claws in which the edges of the mirror are received and confined; the mounting of the ball and socket joint upon the spacing plate between these jaws; and the introduction of packings or fillings between these jaws and the spacing plate to compensate for varying widths of glass or unevenness in the dimensions thereof.

In the accompanying drawings in which is illustrated the preferred embodiment of the device—

Figure 1 is a top plan view of a mirror and its holder in position upon a portion of a vehicle structure.

Fig. 2 is a side elevation of the same.

Fig. 3 is a central longitudinal section of the device.

Fig. 4 is a detail view showing the method of adapting the clamp to a rectangular vehicle structure; and Fig. 5 is a detail view illustrating the method of applying the clamp to a vehicle structure which has no available existing rail in position to receive the device.

A represents the mirror; B the holder for said mirror; C the spacing plate serving as a bracket upon which the holder is carried; and D a clamp carrying the bracket and through which the device is to be attached to the part of the automobile upon which it is to be mounted.

The mirror A is in the form of a panel, elongated not only to cover the distance between the ends of the holder, but preferably extending beyond the same so that it will develop a relatively wide range of rearward vision; and, when arranged horizontally in the car will be adapted to afford at one time a view of a vehicle that is assuming a position to pass the driver, as well as a vehicle or other objects of concern that may be more directly behind the driver.

The holder comprises two preferably identical jaws B¹, B² provided with claws B³, so formed and opposed in position that they may be drawn together in the direction of the narrower dimension of the glass and made to embrace and firmly hold the same by the edges thereof; suitable facings or packings B⁴ being preferably interposed to avoid the harshness of metal against glass; the claws preferably having open sides so that the mirror panel may extend beyond them and be adjusted longitudinally between them. The jaws are held together by a bolt B⁵ which also serves to draw the claws into binding pressure upon the edges of the glass, but between the jaws is the spacing and limiting plate C conforming generally to the bases of the jaws; also any desired thickness of fibrous or other sheet filling material may be introduced between jaws B¹, B² and plate C, with its thickness selected to suit the width of the glass, and distributed if necessary to compensate for unevenness in the width of the glass. The use of the single, intermediately-positioned bolt while drawing the jaws together upon the plate, at the same time permits the jaws to compensate for any such unevenness.

Bracket C carries the ball C², and thus serves to unite the holder to the clamp.

Clamp D comprises a plate D¹ carrying hook-like, rail-embracing member D² preferably integral with said plate D¹; and the plate D³ carrying the chuck-member D⁴; the former member D² being shaped to embrace a rail or bar-like structure, for example, the top rail of a wind-shield, and to hang thereon even though not tightly bound thereto; and member D⁴ being adapted, by impingement upon the opposite side of such a rail or bar, either to merely prevent disengagement of the hook while the device is shifting its position longitudinally of the rail, or else to firmly bind the hook upon the rail when the correct position is attained. Plates D¹, D³ also have formed between their faces at their ends opposite to the hook D² and clutch D⁴, a pair of concavities forming a socket for the ball upon which the plates may be drawn for holding the holder at any angular adjustment on the clamp. For drawing the plates together, both at the clamping end and socket end, they are provided with a single screw D⁵ having a large wing head for quick and convenient manipulation. Chuck member D⁴ is preferably designed to arrest downward swing of the device upon a wind-shield rail before the holder could strike the windshield and endanger the same.

The form of clamp D², D⁴ is suitable for most automobile wind-shields, or the frames thereon. To adapt the same clamp for use in those few instances in which the frame is of rectangular construction, as suggested in Fig. 4, a wedge E may be introduced in position to permit the end of the chuck D⁴ to ride up upon its inclined face when screw D⁵ is tightened, and so bind the clamp upon the frame.

For ready application of the device to the interior of an inclosed body where the usual wind-shield rail or frame is not available, a rail bracket F (Fig. 5) may be attached to the inner face of the front wall of such body.

Bracket C is sufficiently inset from the end of the holder to allow projection of one end of the mirror laterally outward a material distance beyond the limit of outward movement of the clamp upon the rail. By similarly constructing the holder symmetrically on opposite sides of the bracket, the device is equally adapted for both right and left hand drive. The quick and convenient adjustment of the self-retaining hook adapts the device for ready readjustment for shifting positions of wind-shield. Identity of form of the two jaws of the holder facilitates and therefore cheapens production, as does the simplicity of assembly of these two members upon the plate or bracket and the method of application of the clamping plates thereto. Hook D² being open sided in the direction of the plane of the glass plate and transversely of the length of the holder is adapted to determine the direction of adjustment of the device in the direction of the plane of the mirror.

From the foregoing description it will be seen that the device is constructed with special reference to assembly of parts, its application to the car, and the insertion of a new glass, all by the purchaser or user, without the use of any special tools for assembly, or special machine for upsetting metal to embrace the glass.

I claim:

1. An automobile mirror comprising a mirror, a holder embracing the mirror, and an attaching clamp carrying said holder; said holder comprising a pair of jaws having opposed embracing claws, means drawing them together upon and edgewise of the mirror, and a plate interposed between said jaws and upon which said jaws are drawn by said last-named means and having a protruding portion which the attaching clamp grips in carrying the holder.

2. An automobile mirror comprising a panel-like mirror, a holder embracing the mirror, and an attaching clamp carrying said holder; said holder comprising a plate elongated in the direction of the length of the mirror and jaws, and said jaws having attaching bases seated upon and secured to opposite sides of said plate.

3. An automobile mirror comprising a mirror, and a holder embracing the mirror; said holder comprising a pair of jaws having opposed embracing claws with means drawing them together edgewise of the mirror, and a plate interposed between said jaws and held thereto by said last-named means; said plate carrying a ball; and a clamp comprising a pair of plates constructed at one end to embrace said ball and at the other end to engage a rail, and means drawing the pair of clamp plates together.

4. An automobile mirror comprising a mirror, a holder embracing the mirror, and a bracket carrying said holder and having an attaching clamp; said holder comprising a pair of jaws having opposed embracing claws with means drawing them together edgewise of the mirror, and a plate interposed between said jaws; said clamp carrying the holder through the medium of said plate and comprising a rail-embracing hook and a member coacting with said hook to grip the rail.

Signed at Chicago, Illinois, this 9th day of September, 1919.

GEORGE H. LUTZ.